Fig. 1.

Feb. 5, 1935.  E. W. MILLER  1,990,240

PROGRESSIVE MULTIPLE SPINDLE GEAR SHAPING MACHINE

Original Filed Jan. 26, 1928   7 Sheets-Sheet 2

INVENTOR
Edward W. Miller

Feb. 5, 1935.   E. W. MILLER   1,990,240
PROGRESSIVE MULTIPLE SPINDLE GEAR SHAPING MACHINE
Original Filed Jan. 26, 1928    7 Sheets-Sheet 3

INVENTOR
Edward W. Miller

INVENTOR
Edward W. Miller

Patented Feb. 5, 1935

1,990,240

UNITED STATES PATENT OFFICE 1,990,240

PROGRESSIVE MULTIPLE SPINDLE GEAR SHAPING MACHINE

Edward W. Miller, Springfield, Vt., assignor to The Fellows Gear Shaper Company, Springfield, Vt., a corporation of Vermont Continuation of application Serial No. 249,569, January 26, 1928. This application June 2, 1934, Serial No. 729,134

32 Claims. (Cl. 90—9)

The present invention relates to gear shaping machines of the type using a cutter having a series of radially projecting teeth arranged concentrically about an axis, the cutting edges of which are at one end of the cutter, and in which the generation and cutting of gear teeth in the work is effected by producing simultaneous rotation of the cutter and work about different axes and endwise relative reciprocation between the cutter and work; the cutter then acting in the manner of a planing or shaping tool. The object of the invention is to increase the output of completed gears per machine and is accomplished by providing a plurality of work spindles, on each of which a gear blank to be cut is mounted, a number of said gear blanks being acted upon simultaneously by the cutter and all of them being cut progressively to increasing depth by successive parts of the cutter. As a practical measure, the spindles are arranged so that at any given time one of them is approximately in position for removal of the finished work and substitution of a new gear blank, while all the others are in position to hold their work pieces in cutting relation to the cutter.

The nature and principles of the invention are more fully explained in the following specification in connection with a detailed description of certain specific embodiments of such principles shown in the drawings furnished herewith.

In the drawings,—

Like reference characters designate the same parts wherever they occur in all the figures.

Figure 11:
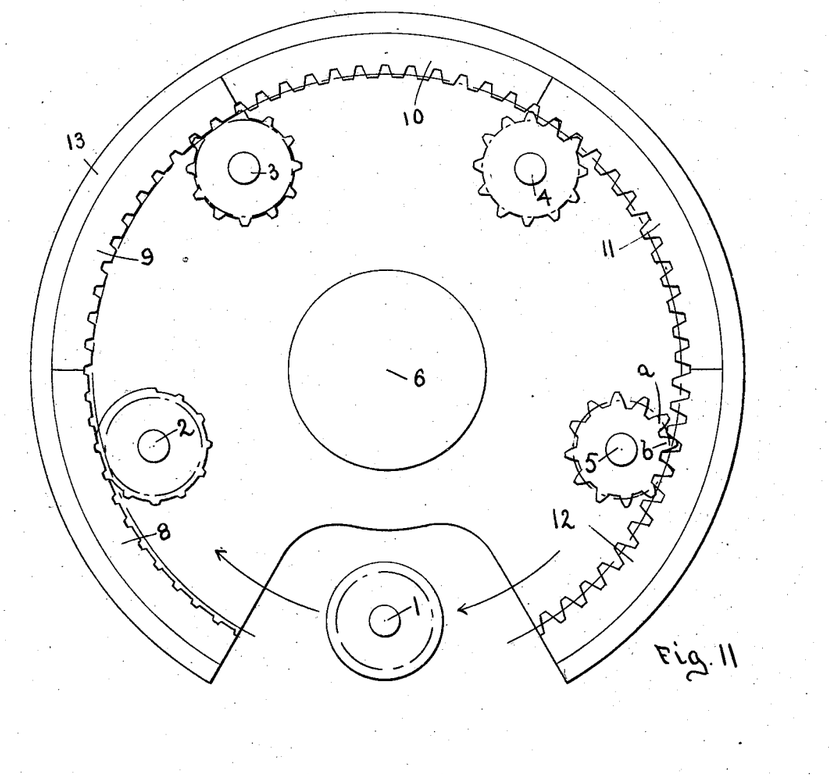
Fig. 11 is a diagrammatic plan view illustrating the character of the generating and cutting action performed by this machine.

Before describing in detail the machine here shown, I will explain with reference to Fig. 11 the character of the work done by the machine. As mentioned in the introductory statement of this specification, it is a cutting operation performed simultaneously on a number of work pieces and a progressive action is performed in turn upon each. For this purpose a number of work spindles 1, 2, 3, 4, 5, etc. are provided spaced equidistantly from and equally around a common center 6, and all parallel to one another. The cutter consists of a series of cutting elements or segments 8, 9, 10, 11 and 12, each having teeth similar to the teeth, or portions thereof, of a gear. Said elements or segments are secured to a holder ring 13 in series on the arc of a circle concentric with the axis 6 and their teeth are spaced equally apart with reference to a common pitch circle concentric with this axis. In the particular embodiment here shown, the teeth of the cutting elements correspond to the teeth of an internal gear, except in the particulars presently pointed out, but the invention is not limited to the cutter of the internal gear type as distinguished from one of the external gear type, as is later explained.

The teeth of segment 8 are short and lie outside of the common pitch circle of the segments. They correspond to the base or root portions of internal gear teeth and have only such height as will enter the work to a selected fraction of the total required depth of cut. The teeth of the cutter segment 9 have greater height than those of the segment 8, to the extent of a second fraction of the total depth; those of the cutter segment 10 have greater height by approximately the same amount; those of the cutter segment 11 have approximately equally greater height than those of cutter 10; and those of the last cutter segment 12 have the full height, width and outline necessary for generating and cutting teeth of the finished length and form in the work.

The cutter segments do not occupy a complete circumference, but they, and the housing in which the cutter is held, are interrupted at one side to provide an open space of width sufficient to give access of a workman to the spindle traversing such space so that he may remove a finished gear from the spindle and substitute a gear blank in place of it.

It may be assumed for the purpose of this explanation that the spindles revolve bodily about the center 6, in the direction indicated by the arrows in Fig. 11, and that each spindle is rotated about its own axis at a speed which causes the gear blank thereon to roll on its pitch circle along the pitch circle on which the cutter teeth are arranged, in the manner of a planet pinion rolling in mesh with an internal sun gear. Meanwhile the cutter is reciprocated rapidly along the line of the axis 6, and with each stroke in one direction planes off those parts of all of the gear blanks (work pieces) which are in position to be so acted upon.

Each cutter segment is at least equal in pitch circle length to the pitch circle circumference of the gear blanks and has at least as many teeth as are to be cut in the work. Thus each blank, in making the circuit of the cutter, is cut throughout its entire circumference to a greater depth by each successive cutting segment. There may be as many such segments as the number of successive cuts which are determined upon as necessary to finish the gear, and the complete cutter is made of a sufficiently large diameter, in proportion to the diameter of the gear blanks, to accommodate the number of segments thus determined. I have found that for some classes of work five cuts are enough to make the finished gear without taking too heavy a cut at any stage, and have shown that number here; but it is to be understood that I may provide less or more than that number according to circumstances.

The number of work spindles is determined by the speed of cutting carried out by the machine and the ability of the attendant to remove and replace gears and blanks on the exposed spindle. The desideratum is to present finished work pieces as fast as a competent attendant can remove them and substitute blanks continuously throughout the working time without excessive fatigue. I have found it entirely feasible with the use of five spindles as here shown to operate the machine at speeds, as to both cutting and generating travel, such that a finished gear of the size of the largest gear in the standard automobile transmission is presented at the discharge point every thirty seconds. Smaller gears may be cut more rapidly; and so may gears of any size with the provision of a larger number of spindles, other things being equal.

Figure 1:
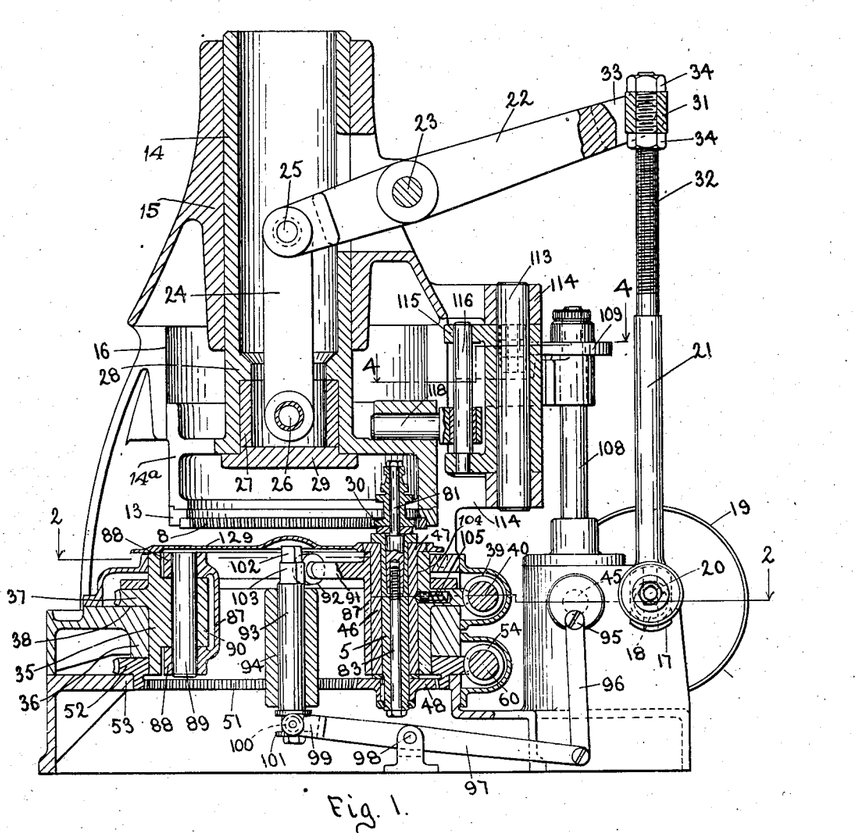
Fig. 1 is a vertical central section through the cutting head and work holder of the machine on an offset plane, the position of which is indicated by the line 1—1 in Fig. 2.

The cutter is carried by a cutter spindle 14 which fits slidingly in an upright guide 15 and has a head 14a of approximately the same diameter as the cutter, which forms the housing previously mentioned, and in turn is fitted to slide in a guide 16. The guides here mentioned are parts of a base or framework of any suitable construction and form, which supports the work drum, later described, and other moving and stationary parts. In Fig. 1, which shows the features just described, the cutter as a whole is indicated by the same reference character 8 previously used to denote one of the segments of the cutter.

For reciprocating the cutter I provide a crank arm 17 on a main shaft 18 which is driven by a belt pulley 19 or other suitable means. Crank arm 17 has a radial guideway in which is adjustably mounted a crank pin 20 coupled to a connecting rod 21, which rod is in turn coupled to a lever 22 arranged to oscillate on a pivot 23 secured to the side of the guide 15. One arm of the lever 22 extends into the hollow interior of the tubular cutter spindle 14 and is connected therewith by a link 24. This link is connected to lever 22 by a coupling pin 25 and to the cutter spindle by a wrist pin 26, the ends of which are seated in a sleeve 27, fitted removably in the spindle and seated at its inner end against a shoulder 28 in the latter and confined at its outer end by a plate 29 overlapping the adjacent end of the spindle and detachably secured thereto by bolts or other suitable means of well known character.

The cutter is shown in Fig. 1 as arranged to cut a gear 30 forming a part of an integral collection of coaxial gears such as are used on the countershaft of the standard automobile transmission. In order to adjust the position of the cutter for the other gears of the same collection, or any others which have to be placed in a different plane from that of the gear 30, the connecting rod 21 is coupled to lever 22 by a sleeve 31 fitted to slide on the threaded part 32 of such rod and having external pivot studs received in bearings in the forked end 33 of lever 22. Adjusting nuts 34 meshing with the threaded part 32 secure the sleeve 31 in different positions. Adjustment of the length of stroke of the cutter is effected by setting the crank pin in the guideway of crank arm 17 more or less distant from the axis of shaft 18. The cutter head or housing 14a, carrying a cutter of the internal gear type as here shown, is necessarily of hollow formation and recessed deeply enough to receive those parts of the gear assemblage, or other associated parts, which extend above the gear element 30.

Save for a limited oscillating movement, the cutter has no other movement than that of reciprocation above described, which effects the cutting.

Figure 2:
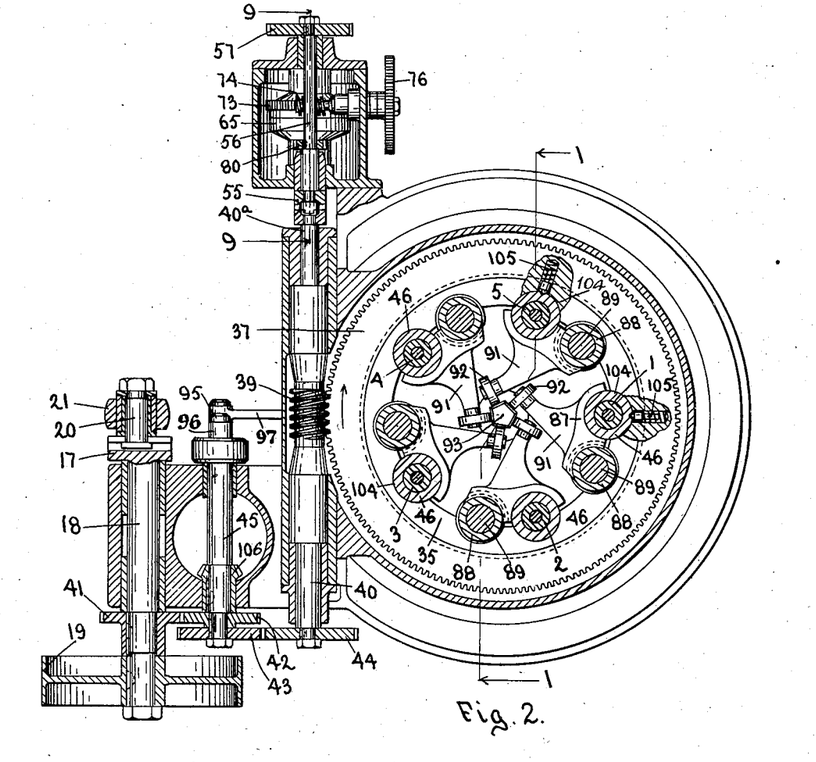
Fig. 2 is a horizontal section on an offset plane indicated by the line 2—2 of Fig. 1.
Figure 3:
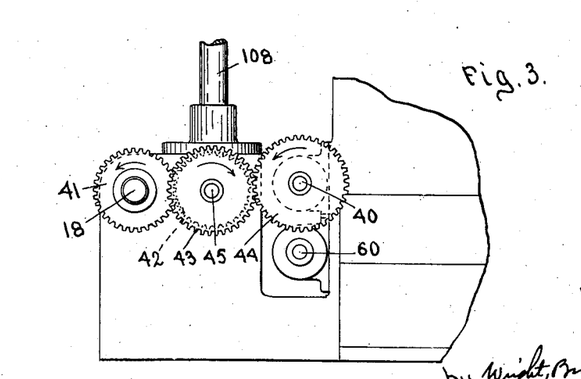
Fig. 3 is a fragmentary elevation showing the gear train represented in section in Fig. 2.

The work spindles are all carried by a work drum 35 fitted to turn in a guide bearing 36 in the machine base, co-axial with the cutter head 14a, and fitted with a worm gear 37 which rests on a horizontal surface 38 adjacent to the bearing 36. It is driven by a worm 39 meshing with the worm gear 37 and carried by a shaft 40, which latter is driven from the main shaft 18 through a gear train 41, 42, 43 and 44 (Figs. 2 and 3). The intermediate gears 42 and 43 of this train are secured on a shaft 45 by which accessory parts of the machine are driven. Gears 41 and 42, which drive the shaft 45, are of equal size so that the shaft 45 is turned at the same angular speed as shaft 18. Gears 43 and 44 are changeable gears whereby different speeds of rotation may be given to the work carrying drum 35.

Figures 6, 7, 8, 9, 10:
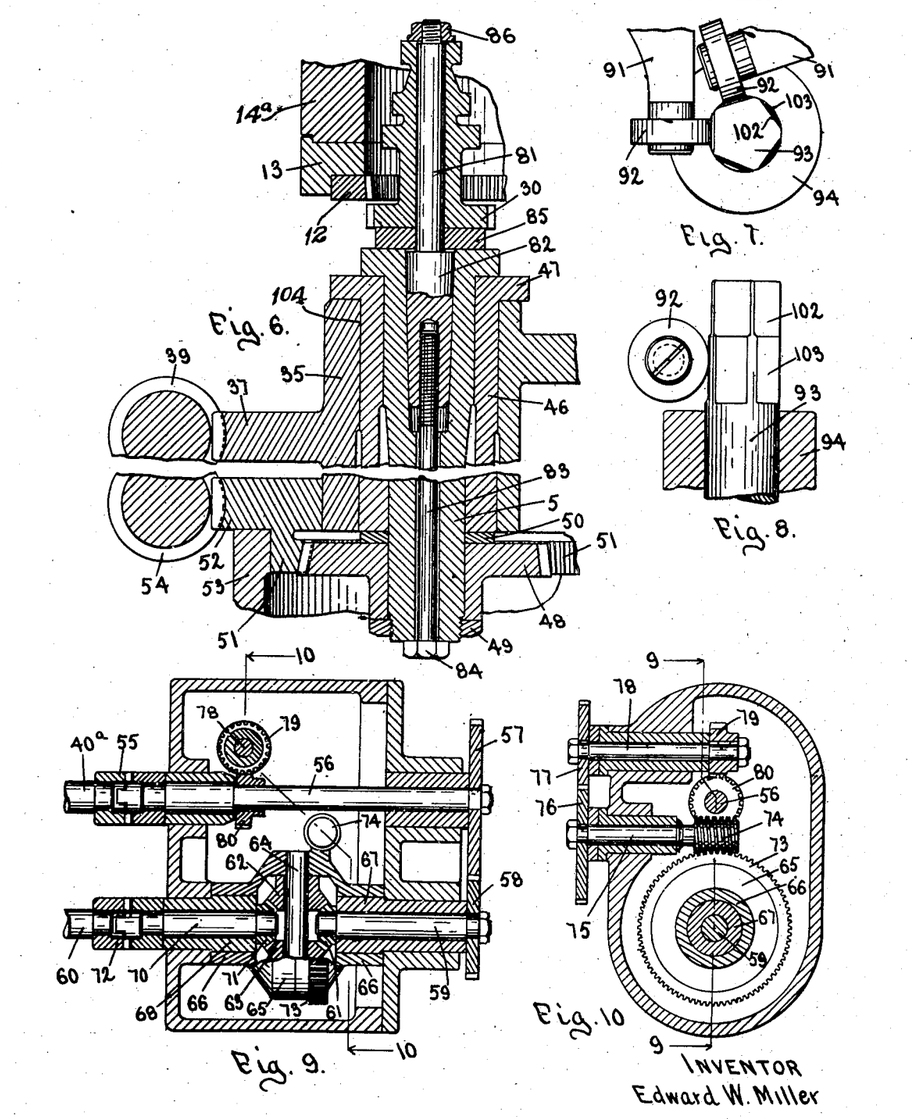
Fig. 6 is a fragmentary section on a larger scale taken through the axis of one of the work spindles.
Fig. 7 is a fragmentary elevation of part of the means for affording radial relief between the cutter and work during the non-cutting strokes.
Fig. 8 is an elevation of the parts shown in Fig. 7.
Fig. 9 is a vertical section of part of the mechanism for controlling the rotation of the work spindles, the plane of such section being indicated by line 9—9 in Figs. 2 and 10.
Fig. 10 is a section on line 10—10 of Fig. 9.

The work spindle indicated at 5 in Fig. 1 is shown in section in Fig. 1 and likewise shown on a larger scale in Fig. 6. All the work spindles are alike, and a description of this one will suffice for all. It is seated to rotate in a bearing 46 forming part of an apron or carrier later described, and having a flange 47 which overlaps and rests on the upper rim of the holder 35. A driving gear 48 is secured to the protruding end of the spindle below the bearing sleeve 46, preferably keyed to the spindle, and held thereon by a nut 49. A washer or distance collar 50 is located between the gear 48 and the end of bearing 46.

Gear 48 meshes with a large internal gear 51 and serves to rotate the spindle about its own axis while being revolved about the axis of the cutter head by the holder 35. The teeth of the gears 48 and internal gear 51 are complementally tapered to a slight degree, as shown in an exaggerated way in the drawings in order to eliminate backlash, and the collars or distance plates 50 are made of such thickness as to position the gears 48 where they will engage the internal gear with a minimum of backlash but without binding. If the teeth wear thin in course of time, the distance plate may be made thinner in proportion.

In the simplest form of the machine, that designed to cut gears of only one diameter, the spindle carried gears 48 may be of exactly the same pitch diameter as the gears to be cut and the internal gear 51 may be of exactly the same pitch diameter as the cutter. In that case the gear 51 may be fastened stationary to the machine base and it will give exactly the required rotary movement to the work pieces. But it is preferable to make the machine adjustable to work of different sizes, and it is generally preferable in the interest of accuracy to make the rotation controlling gear 48 substantially larger than the work piece. Therefore, to suit these conditions and at the same time rotate the work about its own axis in the proper ratio, I have made the large control gear 51 rotatable and provided a changeable gear train for rotating it.

The gear 51 is connected with an external worm gear 52 and is fitted to a bearing in a ledge 53 in the machine base on which the worm gear 52 rests. A worm 54 meshes with and drives the worm gear 52 and is driven from the worm shaft 40 by the following mechanism, shown in Figs. 2, 9 and 10. The extremity 40a of shaft 40 is connected by a coupling 55 with a shaft 56, on the extremity of which is a gear 57 meshing with a gear 58 on a shaft 59 which is in alinement with the shaft 60 carrying the worm 54. Shaft 59 carries a bevel pinion 61 meshing with two planetary bevel pinions 62 and 63 carried on a transverse pivot 64 in a housing 65 which is mounted to rotate about the axis of shaft 59, having hubs 66 fitted to turn on the bushings 67 and 68 in which the shaft 59 and a shaft 70 alined therewith have their bearings. Shaft 70 carries a bevel pinion 71 which also is in mesh with the planet bevel pinions 62 and 63 at the opposite side of the latter from the pinion 61. Shaft 70 is connected with the worm shaft 60 by a coupling 72.

The housing 65 carries an external gear element 73 with which meshes a worm 74 on a shaft 75. The latter shaft is connected by gears 76 and 77 with a shaft 78 carrying a helical gear 79 in mesh with a helical gear 80 on shaft 56. This mechanism provides two gear trains through which in cooperation the shaft 40 drives the worm 54. One of such gear trains includes the bevel pinion assemblage, which forms a differential gearing driving the shaft 70 at a ratio to the speed of the shaft 59 determined by the rate of rotation given to the housing 65. The gear pairs 57, 58, and also 76, 77 are changeable gears, by the proper selection of which any desired speed of rotation may be given to the worm 54. For some classes of work, the proper speed of the control gear 51 may be given by the change gears 57 and 58 alone without any movement of the differential gear housing, and for such cases the differential gearing is unnecessary; but the latter makes possible a more minute variation or change in the different speeds which may be given to the control gear 51, enabling it to be driven at certain speeds which could not be obtained by any single pair of change gears on the shafts 56 and 59.

In adjusting the machine to cut gears of a different pitch diameter than the work piece 30, the cutter holder 13 is removed from the cutter head 14a and a cutter of appropriately different diameter is substituted. The cutter holder is fitted to the head in the manner clearly shown in Fig. 1 and detachably secured thereto by screws or other well known appropriate fastening means not necessary to be shown here.

The part of the work spindle which directly holds the work is a stem or shank 81 which fits the bore of the work piece and has an enlarged tapered end 82 fitted to a tapered socket in the spindle and drawn into tight engagement therewith by a screw rod 83 extending through the spindle from its lower end and having a bolt head 84. The work piece rests on a collar 85 which in turn rests on the end of the spindle, and is clamped down by a nut 86 screwed on the end of the shank.

Relief of the work after each cutting stroke to avoid rubbing of the cutting edges of the cutter teeth on the work during the return strokes is afforded by the means which I will now describe. The bearing sleeve 46 of each spindle is formed as part of, or is secured to, an apron or holder 87 having bearing hubs 88 fitted to a pivot pin 89 mounted in a boss 90 attached to or integral with the drum 35; such boss, pivot, and hubs for the apron of spindle 2 being shown in Fig. 1. The aprons have arms 91 carrying rolls 92 so arranged as to bear on different sides of a bar 93 located and movable endwise in the axis of the drum. Said bar is so movable in a fixed guide 94 supported by the machine base and is reciprocated by the shaft 45, previously described, through the medium of a crank pin 95 connected to said shaft, a connecting rod 96 coupled to the crank pin, and a rock lever 97 pivoted on a stationary fulcrum 98, and of which one arm is coupled to the connecting rod. The opposite arm of lever 97 is forked at 99 to embrace the lower end of bar 93 and carries studs 100 entering the groove between collars or shoulders 101 on the bar. The upper end of bar 93, which rises between the rolls 92 carried by the several work spindle aprons, serves as a cam, having a low dwell 102 and a high dwell 103 at each side adjacent to the several rolls 92. When the bar is raised, the rise to its high dwell 103 moves the aprons outward and simultaneously forces all of the spindle carrying sleeves into firm engagement with the recessed semi-cylindrical seats 104 in the inner side of the drum 35. When the bar is lowered, the low cam part permits the spindles to be moved slightly out of such seats by springs 105 situated in the drum and acting on the spindle holding sleeves in the manner shown in Figs. 1 and 2, or in any other suitable manner and arrangement. As the shafts 18 and 45 turn at the same speed, the relief and seating movements of the spindles, just described, are given in proper timing with the strokes of the cutter; the relief movement occurring at the end of the cutting stroke after the cutter has passed through the work and the seating movement occurring after its return and before it has commenced the next cutting action. Except for these movements, the work spindles are and remain at an invariable distance from the axis of the cutter; and at all times when cutting strokes occur there is absolutely no variation in center distance between any work piece and the cutter.

Although the cam part of the bar 93 is shown here as having flat sides equal in number to the spindles, which requires the bar to be rotated by and with the spindle aprons in their revolution, it will be understood that this part of the bar may equally well be made with cylindrical surfaces.

Figure 4:
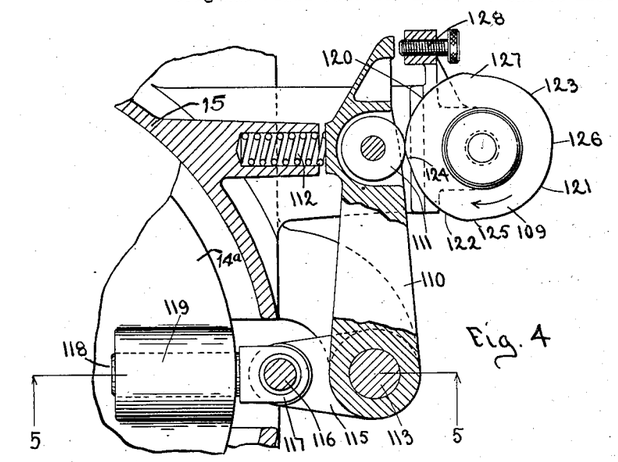
Fig. 4 is a horizontal section taken approximately on line 4—4 of Figs. 1 and 5.
Figure 5:
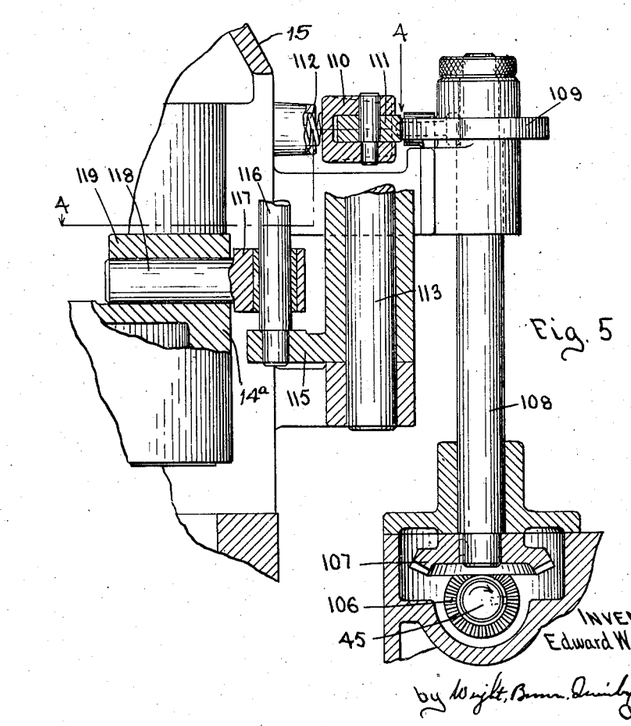
Fig. 5 is a vertical section taken on line 5—5 of Fig. 4.

The teeth of the cutter are backed off on the sides and outer ends to afford cutting clearance, causing contact with the work pieces to occur only at the cutting edges in the larger ends of the teeth; and are sharpened at need by grinding away the end faces in which these cutting edges lie. The effect of thus grinding the teeth is to make them narrower, and in order to enable them to continue the cutting of teeth having a given width in the work, after being thus narrowed, the center distance between cutter and work pieces remaining the same, I provide a means for oscillating the cutter head slightly about its axis in alternate directions. This means is partly shown in Fig. 1 and more fully in Figs. 4 and 5.

A bevel gear 106 on shaft 45 meshes with a bevel gear 107 on an upright shaft 108 which carries a cam 109. Such cam acts on a lever 110 through a roll 111 mounted on the latter and pressed against the cam by a stiff spring 112 which reacts on the machine frame. Lever 110 turns on a pivot rod 113, mounted in brackets 114 on the machine frame, and carries arms or lugs 115 in which is mounted a coupling pin 116. This pin is parallel in all of its positions to the reciprocating travel of the cutter and is embraced by an eye 117 formed on a stud 118 which is seated in a radial socket 119 in the cutter head and is movable endwise with a close sliding fit therein. The coupling pin 116 is long enough to maintain engagement with the eye 117 throughout the whole reciprocating movement of the cutter head in any location where such reciprocation may take place, and thus constantly maintains a connection for transmitting oscillation from lever 110 to the cutter head.

Cam 109 has a high dwell at 120 and a low dwell at 121 and is so timed with the cutter reciprocating crank, being rotated at half the angular speed of the latter, that these high and low dwells alternately control the cutter head during alternate cutting strokes. Preferably also the cam has intermediate dwells 122 and 123 at opposite sides between the high and low dwells for positioning the cutter teeth clear of the teeth in the work piece, thus affording relief of the cutter additional to that given by the backing off movement of the work spindles, during the noncutting or return strokes. The cam descents and rises between the several dwells are indicated at 124, 125, 126 and 127 in Fig. 4. They are so located as to give the required angular movements to the cutter at the ends of its opposite strokes. Thus the cutter teeth are caused to act first at one side and then at the other on opposite sides of the teeth being cut, during alternate cutting strokes.

The radial difference between the high and low dwells of the cam is great enough to produce the angular movement required when the cutter teeth have been reduced to their least thickness at the end of their useful life after repeated sharpenings. Hence in order to meet the conditions from the beginning of the use of the cutter, when its teeth may have the full width, through intermediate stages when its teeth become narrower, I provide an adjustment consisting of a screw 128 mounted in a part of the machine frame where it serves as a stop in the path of the lever 110, limiting the movement of the lever toward the axis of the cam. By this means the lever may be wholly restrained from movement or permitted a movement of any extent up to the limits of the cam.

It will be noted that the coupling pin 116 is a guiding element which positively prevents any rotational or oscillative movement of the cutter head except such movement of that character as is imparted to it by the cam 109. Thus the cutter is constrained to travel in a definite fixed path when making its cutting strokes, and such oscillative movements as are imparted to it for the purpose described take place only before and after the successive cutting strokes. No reliance is placed on the cutter reciprocating means (i. e., lever 22, link 24 and wrist pins 25 and 26) for thus guiding the cutter, and no looseness need be provided between these parts in order to permit of the oscillative movement as required, for the sleeve 27 through which reciprocation is imparted to the cutter is rotatable within the cutter spindle 14. The generative action and effect, by which correct face curves are given to the teeth of the work piece, is accomplished by the rolling traverse of the work pieces along the pitch circle of the cutter.

Other means, including positive means for oscillating the cutter head in both directions, instead of a spring for moving it in one direction, may be used in place of the specific mechanism here shown and just described without departing from the invention and the protection which I claim. But that here shown affords a very simple means for giving the desired movement with the necessary capacity for adjustment. I have found that with the use of a spring 112 of sufficient stiffness, the cutter is held up to the work in a wholly satisfactory manner. This capacity for lateral movement avoids necessity of changing the distance between the axis of the work spindles and the axis of the cutter, in other words, the center distance between the several work pieces and the cutter, to compensate for narrowing of the teeth, which would require complicated means to achieve simultaneously with a plurality of work spindles and would be difficult to accomplish accurately.

Although sharpening of the cutter teeth also shortens their length, due to the clearance bevel of their outer end faces, such shortening does not necessitate any change in the center distance between the cutter and work spindles, because the cutter teeth are made with sufficient excess length originally to allow for shortening in this manner. The teeth of cutters used in gear cutting machines in standard practice are always made longer than the teeth of gears conjugate to the work pieces, in order to cut tooth spaces amply deep to leave clearance for the mating gear teeth. This practice is followed in the final or finishing segment 12 of the present cutter. The depth of tooth spaces in a gear is a value which may be varied within wide limits without affecting the accuracy or sacrificing essential strength of the gear teeth; and the shortening of the teeth of my cutter at the end of its useful life is less than such permissible variation. As the teeth of all the segments of my cutter are bevelled to the same degree and ground away substantially equally in sharpening, the increment of tooth length between successive segments remains substantially the same at all times.

A shield 129 is arranged over the work carrying drum, having apertures for the spindles, to deflect chips and oil away from the interior of the drum and into the runways provided for taking care of these matters. Suitable housings, casings, etc. are provided elsewhere to guard and protect the gears and certain other moving parts, as plainly enough shown in the drawings, or otherwise. I have not attempted to describe in detail these accessories and the supporting structure, as these parts may be embodied in many diverse forms all within the skill of the machine designer. And moreover, the operating mechanisms and parts may be variously modified in construction and arrangement within the scope of the invention.

Figure 12:
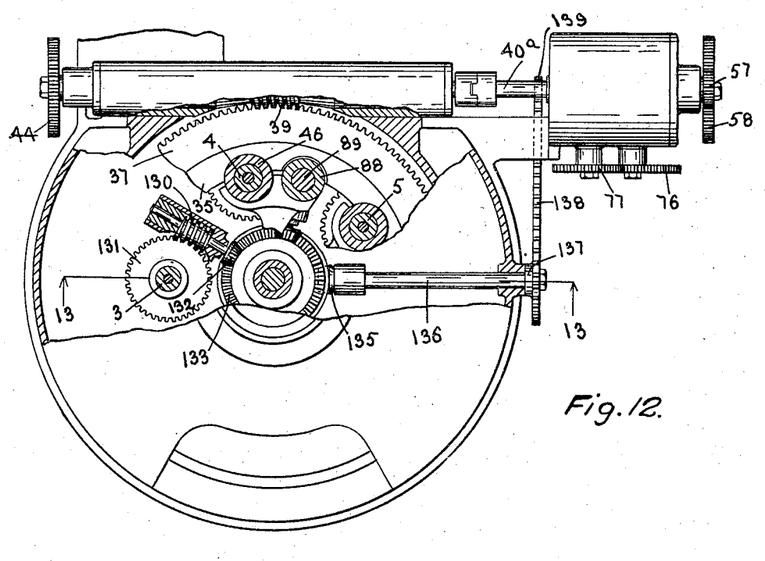
Fig. 12 is a horizontal section and partial plan view of a machine differing in some particulars from that shown in the preceding drawings for doing the same work.
Figure 13:
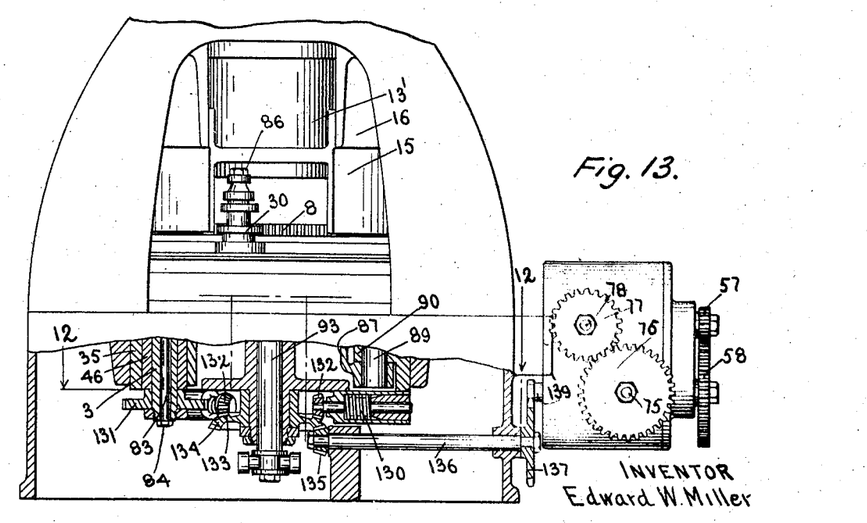
Fig. 13 is in part an elevation of the modified machine shown in Fig. 12 and in part a vertical section on line 13—13 of said figure.

I have shown in Figs. 12 and 13 one possible different arrangement in means for revolving and rotating the work spindles. Here the work carrying drum and individual spindle holders are substantially the same as previously described, but instead of providing a large gear 51 for rotating the spindles, I provide in connection with each spindle a worm 130 carried by suitable supporting means so as to mesh with a worm gear 131 corresponding to the gear 48 previously described. With each worm 130 is combined a bevel pinion 132 in mesh with a bevel gear 133 turning about a central bearing, and connected with a bevel gear 134 in mesh with a driving pinion 135. The latter pinion is secured to a shaft 136 which also carries a sprocket wheel 137 and the sprocket is driven by a chain 138 from a sprocket on the shaft 139 which corresponds to the shaft 70 of the previously described machine. The shaft 139 is controlled as to its speed by the changeable speed gearing shown in detail in Figs. 9 and 10, and it drives the gears 131 through the intermediate gear train just described, at the speed necessary to roll the work pieces in the required manner past the cutter teeth. The worms here shown, having a small angle of lead, have the advantage of locking the spindles. In other respects the machine is the same as previously described and the parts are designated by the same reference characters so far as they appear in Figs. 12 and 13.

Figure 14:
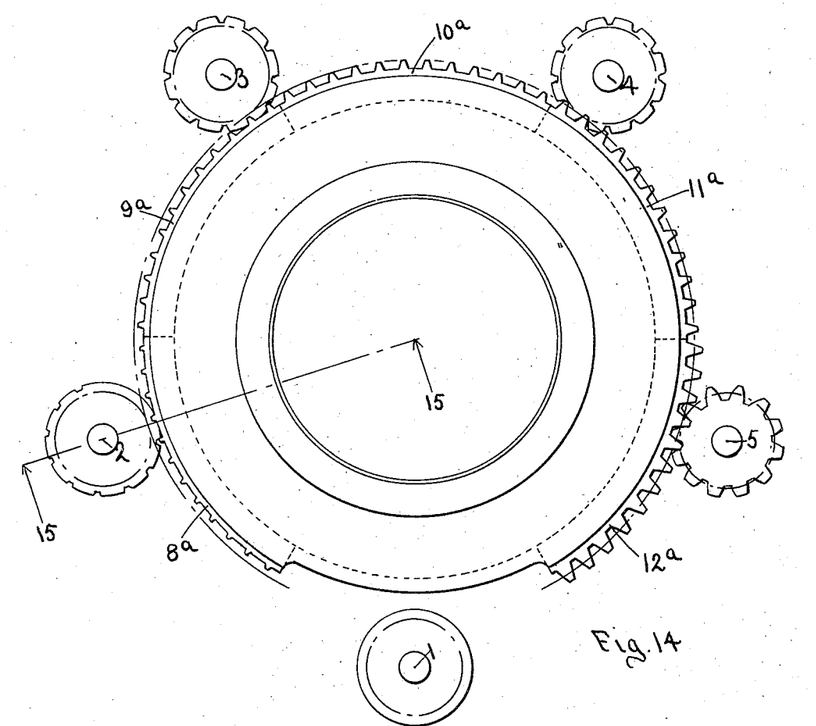
Fig. 14 is a diagrammatic plan view similar to Fig. 11 showing the application of a specifically different cutter for doing the same work.

In the introductory part of this specification I described in detail one form of cutter suitable for the uses of my new invention. I wish to make it understood, however, that I may use other cutters of substantially different character. Thus in Figs. 14 and 15 I have shown a cutter in which the teeth are arranged as in an external gear rather than an internal gear and in which, moreover, the individual teeth are somewhat different in character as to all the sections of the cutter except the last section. Thus in the section 8a, the teeth are not only short, but are thin also, whereas in the corresponding section 8 of the cutter shown in Fig. 11 they correspond to the roots of full width teeth. In section 9a the teeth are both longer and wider; in section 10a they are still longer and wider; in section 11a yet longer and wider; and in section 12a they have the full length, width and form necessary to shape the teeth in the work to the prescribed finished size and form. Hence the teeth of successive sections, instead of merely deepening the tooth spaces in the work, as is done in the cutter first described, both deepen and widen such spaces as well. The form of tooth shown in Fig. 14 may be employed with the internal gear type of cutter shown in Fig. 11, and vice versa.

Figure 15:
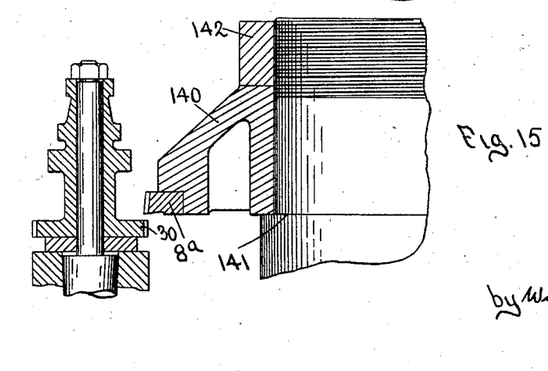
Fig. 15 is a fragmentary section of the cutter and one of the work pieces shown in Fig. 15 taken on line 15—15 of the latter figure.

In applying the external gear type of cutter to a machine of the character here shown, the work spindles are necessarily arranged outside of the circumference of the cutter, and the movement given them for relief must be outward instead of inward with respect to the axis of the cutter. In other respects the machine using the external cutter is or may be substantially identical with that using the internal cutter; and it is equivalent in its differences. Fig. 15 shows illustratively one of the possible modes in which the external cutter may be applied to the cutter spindle; the section of the cutter being attached to a holder 140 fitted externally to the spindle and clamped against a shoulder 141 thereon by a nut 142.

It will be apparent that my new machine, in comparison with the single spindle gear shaping machines, speed of cutter travel and amount of metal taken off at each cut being equal, is capable of turning out work faster, proportionally to the number of spindles in cutting positions, (in this illustration four times as fast); and that in addition a still further time saving is obtained through omission of the preliminary radial depth feed necessary in cutting each gear with the single spindle machines before carrying on the rotative generating movement.

So far as I am aware, all prior gear generating machines, operating on the Fellows shaping principle, require a progressive depth feed in addition to the generative rotation. Such depth feed can be performed either as a step independent of the generative travel, or simultaneously with such generative travel. In either case it consumes time additional to that required for the complete generation of a gear after the cutter has been fed to full depth. Furthermore, when the depth and rotary feeds are combined in the prior art machines, a greater load is imposed on the cutter during the performance of the depth feed than afterwards, which it is desirable to avoid.

This invention affords a means by which the gear blank may be brought directly into pitch circle relationship with the cutter teeth for immediate commencement of tooth generation without preliminary depth feed; and this would be equally the case if the cutter were provided with only the finishing series of teeth or with a smaller number of preliminary teeth than here shown. The last series of teeth, or the next to the last series, could be brought directly into engagement with the uncut blank and would perform satisfactory service if the first one or more series of teeth (8, 9, etc.) were omitted. In this aspect of the invention it is immaterial whether the cutter is provided with many or few preliminary roughing sets of teeth, or with none at all. The importance of the large number of progressive roughing teeth here shown follows from the better distribution of duty and wear among the different sets of teeth, the ability of the cutter tool to act effectively and progressively on a large number of gear blanks at the same time, and the more rapid production of finished gears.

Although the space occupied by the collection of work spindles and cutter head is somewhat larger than that of the cutter and work spindles in the old type machine, the machine as a whole is not larger or more costly in at all nearly equal proportion to the increased number of spindles and increased output capacity. At the same time all the advantages due to finishing the gear in a plurality of cuts are secured without time loss. The last section of the cutter may, if desired, be made to take a very light finishing cut for the greatest accuracy and best finish.

It is to be understood that the foregoing description of a specific machine and modifications thereof is illustrative of the invention rather than a limitation to the specific construction and arrangement of the machine and parts thereof so described. Evidently many variations in construction and arrangement and reversals in the mode of operation of the moving parts may be made without departure from the principles and cooperative law of the invention. For instance, it would not be a departure from the invention to rotate the cutter instead of revolving the work pieces planetwise in achieving the generating movement, or to effect the cutting travel by reciprocating the work pieces rather than the cutter in the axial direction. These and other equivalent embodiments of the invention are within the contemplation of my invention and within the scope of the appended claims.

Referring to the cutter, the parts thereof which I have described as cutting elements or segments are, more broadly, groups of teeth which, in the broad aspect of the invention need not be made as structurally separate segments but may be integral parts of the whole cutter. On the other hand, each group of teeth may be composed of more than one structurally separate segment or piece.

Every tooth of the cutter is in effect a distinct cutting member, having edges disposed so as to generate a prescribed form in the work. Even without the progressive depth of cut effected by the successive groups of teeth hereinbefore described, the invention has utility as a means for rapidly finishing gears by giving them a rolling planetary movement with respect to a series of cutting members arranged circularly around the axis of the orbit in which the gears travel. That is, the phase of the invention consisting of the combination of such a series of cutting members or units with a number of planetary work spindles and the appropriate operating means, is a useful machine for rapidly finishing in a desired manner gears which have been previously cut in another machine. By means of the multiplicity of spindles, operating successively in connection with the same cutting units, the gears may be brought to finished character as rapidly as it is possible for an operator to remove them and apply new work pieces to the work spindles arriving at the interrupted side of the series.

What I claim and desire to secure by Letters Patent is:

1. A multiple gear shaping machine comprising a shaping cutter having a circular series of teeth, of which the teeth in different parts of such series have different lengths radially of the cutter, a plurality of work spindles arranged about the axis of said series in position to hold a number of work pieces in simultaneous cutting relationship with the cutter, means for effecting relative axial cutting reciprocation between the cutter and work spindles, and means for simultaneously effecting a relative rolling motion between the cutter and work pieces like that between conjugate gears.

2. A gear shaping machine having a single planing cutter with teeth arranged and spaced in the manner of the teeth of a gear wheel, successive groups of teeth in the series thereof being shaped to cut to respectively increasing depth in the work pieces, means for giving a simultaneous rolling movement between the cutter and a plurality of work pieces similar to that between a sun gear and a plurality of planet pinions, and means for effecting relative axial reciprocative cutting movements between the cutter and work pieces.

3. A plurality gear shaping machine comprising a cutter having a series of cutting teeth arranged and equally spaced side by side along a given pitch line, the number of such teeth being a multiple of the teeth to be cut in the work and being arranged in groups or sections, each such group containing a number of teeth as great as the number to be cut in the work and those of each successive group being longer than those of the preceding group; combined with means for effecting simultaneous and progressive generating traverse along said pitch line between said cutter and a plurality of duplicate work pieces, and means for effecting relative cutting traverse between the cutter and work pieces.

4. A plural gear generating machine comprising a cutter having a diameter at least twice as great as the diameter of the gear to be cut and provided with cutting teeth in an arrangement corresponding to that of the teeth of a gear wheel, means for effecting simultaneous planetary movement of a plurality of gear blanks in pitch circle relation to the cutter as to a sun gear, and means for reciprocating the cutter axially, the cutter being interrupted in a part of its circumference to form a space permitting removal of finished gears and substitution of gear blanks in transit across such space.

5. A plural gear generating machine comprising a cutter having a diameter at least twice as great as the diameter of the gear to be cut and provided with cutting teeth in an arrangement corresponding to that of the teeth of a gear wheel, means for effecting simultaneous planetary movement of a plurality of gear blanks in pitch circle relation to the cutter as to a sun gear, and means for reciprocating the cutter axially, the cutter having a set of teeth of a height to cut only a fraction of the predetermined depth of the teeth to be formed in the work, and a second set of teeth of a height sufficient to cut into the work to another fraction of such depth, the number of teeth in each of said sets being at least as great as the number of teeth to be cut in the work.

6. A multiple gear shaper having a generating cutter with teeth arranged side by side along a given pitch line and exceeding by a multiple greater than one the number of teeth to be cut in a single work piece, said teeth in successive parts of the cutter being of progressively increasing height, means for progressively rolling a series of work pieces in succession along the pitch line of said cutter, and means for effecting relative axial reciprocative movement between the cutter and said work pieces.

7. A gear generating machine comprising a planing cutter having teeth arranged in the manner of the teeth of a gear wheel and having a diameter exceeding that of the gear to be cut, a work carrier rotatable coaxially with said cutter, a plurality of work spindles mounted in said carrier equidistant from the axis thereof and distributed about said axis, means for rotating said carrier, and means for rotating the several spindles about their own axes in the course of such rotation of the carrier.

8. A gear generating machine comprising a planing cutter having teeth arranged in the manner of the teeth of a gear wheel and having a diameter exceeding that of the gear to be cut, a work carrier rotatable coaxially with said cutter, a plurality of work spindles mounted in said carrier equidistant from the axis thereof and distributed about said axis, gear wheels connected with the several spindles, and a control gear by which all of said spindle gears are rotated during the rotative movement of the carrier.

9. A gear generating machine comprising a planing cutter having teeth arranged in the manner of the teeth of a gear wheel and having a diameter exceeding that of the gears to be cut, a work carrier rotatable coaxially with said cutter, a plurality of work spindles mounted in said carrier equidistant from the axis thereof and distributed about said axis, means for rotating the work carrier, gear wheels connected with the several spindles, a control gear coaxial with said work carrier in driving cooperation with the spindle gear wheels, and means for rotating said control gear simultaneously with the work carrier at such a speed and in such direction as to effect planetary gear mesh between work pieces carried by the spindles and the cutter.

10. A gear generating machine comprising an axially movable planing cutter having teeth arranged similarly to the teeth of a gear wheel with cutting edges in a plane transverse to the axis of the cutter, the number of said teeth being a multiple greater than one of the number of teeth to be cut in each work piece, a work carrier mounted to rotate about an axis in line with the axis of the cutter, a plurality of work spindles carried by said carrier spaced about the axis thereof equidistantly from such axis and in position to hold work pieces in cutting relationship to the cutter, means for reciprocating the cutter, means for simultaneously rotating the work carrier and also rotating the spindles about their own axes, and means for oscillating the cutter about its axis between successive cutting strokes thereof in opposite directions to an extent sufficient to cause action of the cutter teeth alternately at opposite sides of the spaces in the work pieces wherein the cutter teeth project.

11. In a machine of the character described, a cutter head mounted with capacity for oscillative movements about its axis and reciprocation in the directions of its axis, mechanism for so reciprocating the cutter head, a bar extending parallel to the axis of the cutter head and mounted to oscillate about a parallel axis, means for so oscillating said bar, and a coupling between the bar and cutter head having sliding engagement with the bar longitudinally thereof and with the cutter head radially of the latter.

12. In a machine of the character described, a reciprocative cutter head mounted with provisions for oscillative movement about an axis extending in the same direction as its path of reciprocation, means for so reciprocating the cutter head, a cam driven in timed relationship with the head reciprocating means, an arm controlled by said cam and caused thereby to swing back and forth about an axis parallel to that of the cutter head, a bar parallel to said axis connected with said arm and oscillated thereby about the axis thereof, and a coupling carried by the cutter head having sliding engagement with the bar and formed to transmit the oscillative movements thereof to the cutter head.

13. In a machine of the character described, a reciprocative cutter head mounted with capacity for oscillation about an axis extending in the same direction as its path of reciprocation, means for so reciprocating the cutter head, a cam driven in time with the head reciprocating means having high and low portions, a lever engaged with the cam, a spring bearing on the lever for pressing it against said cam, an adjustable stop for limiting the movement of the lever toward the low part of the cam and regulating the extent of such movement, and connections arranged to transmit oscillative movements of the lever to the cutter-head.

14. In a gear generating machine, a planing cutter having teeth arranged similarly to the teeth of a gear wheel and having a diameter which is a multiple greater than one of the diameter of the work pieces to be cut thereby, a work spindle, means for effecting relative reciprocative cutting movements between the cutter and work spindle, and means for effecting relative rotary generating movements between the cutter and spindle such that the work piece carried by the spindle and the cutter are caused to roll relatively to one another in the manner of intermeshing gears; the cutter having its teeth arranged in groups each containing as many teeth as the teeth of the gear being cut and those of each successive group in the circumference of the cutter being formed to cut to a greater depth in the work than those in the preceding group.

15. A multiple gear cutting machine comprising a planing cutter having teeth arranged similarly to the teeth of a gear wheel and being of a pitch diameter which is a multiple greater than one of the pitch diameter of the work, a work carrier rotatable about the axis of the cutter, a plurality of work spindles supported by said carrier spaced about the axis thereof equidistantly from said axis, means for reciprocating the cutter axially, means for simultaneously rotating the work carrier and also rotating the spindles independently about their axes, and means for displacing the spindles from the cutter after each cutting stroke thereof and holding them so displaced during the return strokes of the cutter.

16. In a gear generating machine of the character set forth, a rotatable work carrying drum, spindle carrying aprons pivoted to said drum about the axis thereof on parallel axes, arms projecting from several aprons into the mid portion of the drum and terminating beside the axis of the drum, the terminal portions of the several arms being spaced about said axis on different sides thereof, work spindles supported rotatably in the several aprons each at one side of the pivot of its respective apron adapted to be seated against a complemental abutting surface of the drum, springs tending to displace the spindles from said seating surfaces, and an endwise movable bar axially arranged in the drum in the space within the before named arm terminals, having low portions adapted by its reciprocation in one direction to swing the aprons so as to force the spindle carrying portions thereof into firm contact with the drum, permitting withdrawal of such portions with its movement in the opposite direction.

17. In a gear generating machine, a cutter, a series of work spindles arranged to hold work pieces in a relationship to the cutter like that of planetary gears to a sun gear, means for reciprocating the cutter to act simultaneously on a number of work pieces, means for giving a planetary rolling movement to the work spindles, means for effecting withdrawal of the spindles from the cutter during the return strokes of the latter, and means for giving oscillative movements to the cutter at the end of each stroke thereof; such movements prior to each cutting stroke taking place in such directions and to such extent as to bring opposite sides of the cutter teeth into action on alternate cutting strokes.

18. A gear cutting machine comprising a series of cutting members or units arranged in a circular arc around a given center, a series of work holding spindles arranged around the same center equidistantly therefrom, means for effecting a simultaneous revoluble and rotational rolling traverse between said work spindles and cutting units, and means for effecting relative cutting traverse between them; whereby gears mounted on said spindles are successively and progressively acted on by the cutting units and desired tooth forms are generated thereby.

19. A plural gear cutting machine comprising a rotatable holder, a plurality of work spindles rotatably mounted in said holder and arranged circularly around the axis of rotation of the latter, a series of cutting units arranged circularly about the same axis in position to act simultaneously upon gears mounted on a plurality of the respective spindles, and means for effecting relative movements of rolling generative travel and cutting traverse between said spindles and cutting units.

20. A machine for simultaneously generating the teeth of a plurality of gears and successively increasing the depth of cut in each gear comprising a cutter having a circular series of teeth with cutting edges in a plane perpendicular to the axis of said series, a plurality of work spindles arranged about said axis and equidistantly therefrom, adapted to carry gears to be cut, and means for effecting relative reciprocative cutting travel and rolling generative travel between said cutter and all of the spindle-carried work pieces simultaneously; the cutter teeth being arranged in groups each having a number of teeth equal to that of the gears to be cut, and the teeth of each successive group being displaced radially from those of the next preceding group by a distance equal to the prescribed steps of depth feed, such displacement as to successive groups being all in the same direction radially of the axis of the series.

21. A gear cutting machine comprising a rotatable holder, a plurality of work spindles rotatably mounted in said holder on parallel axes all at the same distance from the rotational axis of the holder, a series of cutting units having outlines corresponding to those of gear teeth arranged on a pitch line concentric with the rotational axis of the holder and in position to mesh with gears on the respective work spindles, said series of units being interrupted at one side to provide a loading station where gear blanks may be placed on, and finished gears removed from, spindles upon their arrival at such station, means for effecting relative planing traverse between said series of cutting units and the work spindles in the direction of said axis, and means for rotating the work spindles about their own axes simultaneously with the rotation of the holder at the same rate as that of a planetary gear rolling in mesh with said series of cutting units.

22. A plural gear cutting machine comprising a series of cutting units arranged on a circular pitch line and extending through the major part of a circumference about the center of such pitch line, being interrupted in a part of such circumference to provide a loading station for the after mentioned work spindles, said units having cutting edges substantially in the plane of said circular pitch line and having outlines more or less similar to gear teeth, the units at one end of the series being relatively short and narrow as compared with standard teeth, and those at the other end of the series having substantially the full length, width and outlines of standard teeth, while intermediate teeth of the series vary progressively in their dimensions between the two extremes; combined with a plurality of work spindles parallel to one another and substantially perpendicular to the plane of said circular pitch line and equidistant from the center thereof, and means for traversing said spindles bodily about an axis coinciding with said center progressively in the direction in which the successively larger cutting units are arranged, and means for simultaneously rotating the spindles about their own axes at a rate to turn work pieces carried thereby in rolling pitch circle mesh with said cutting units.

23. A plural gear cutting machine comprising a rotatable holder, a plurality of work spindles rotatably mounted in said holder and arranged circularly around the axis of rotation thereof, a series of cutting units arranged side by side circularly around the same axis, each unit consisting of a number of teeth different from the teeth of other units and positioned relatively to the work spindles so that different units operate at the same time on gear blanks mounted on the different spindles, means for rotating the holder and simultaneously imparting a rolling movement to such gear blanks, and means for effecting relative cutting traverse between said spindles and cutting units.

24. A plural gear cutting machine comprising a rotatable holder, a plurality of work spindles rotatably mounted in said holder and arranged circularly around and parallel to the axis of rotation thereof equidistant from such axis, a series of cutting units arranged side by side circularly around the same axis, each unit consisting of a number of teeth different from the teeth of other units, but all arranged on the same pitch circle and the several units being positioned relatively to the work spindles so that different units operate at the same time on gear blanks mounted on the different spindles, means for rotating the holder and simultaneously imparting a rolling movement to such gear blanks so that the gear blanks in turn are carried progressively from one unit to the next, and means for effecting relative cutting traverse between said spindles and cutting units in the direction of said axis.

25. A gear shaping machine comprising a shaping cutter having teeth arranged on a curved pitch line similarly to the teeth of a gear wheel, throughout less than the whole circumference of the cutter, a spindle adapted to hold the gear blank in pitch line relationship to the teeth of said cutter, means for effecting a relative axial cutting reciprocation between the cutter and work spindle, and means for effecting simultaneous relative movements of generating rotation between the cutter and work spindle; the number of said cutter teeth being at least as great as the number of teeth to be cut in the work piece, and the space in the circumference of the cutter where teeth are lacking being sufficiently wide to permit placement of a gear blank in pitch line relationship to the cutter without making contact with any tooth, whereby to cause commencement of generative cutting without preliminary radial depth feed between work and cutter.

26. A gear shaping machine comprising a work spindle and an axially reciprocative cutter spindle aranged on parallel axes, a cutter secured to said cutter spindle having a circumferential series of teeth arranged in pitch line sequence similarly to the teeth of a gear, but interrupted at one side of the cutter, means for reciprocating the cutter spindle, and means for effecting relative generative rotation between the cutter and work spindle at such rates of speed as to obtain the effect of rolling mesh between the cutter and a work piece carried by the work spindle; the interruption between the teeth of the cutter being sufficiently wide to permit placement of a gear blank on the work spindle in pitch line tangency with the cutter, without contacting any of said cutter teeth, when the work spindle is opposite to such interruption.

27. A gear shaping machine comprising the combination with a cutter spindle and means for reciprocating it, a work spindle adapted to hold a gear blank, means for effecting relative generating rotation between the two spindles such that a completed work piece carried by the spindle may roll in mesh with a gear-like planing cutter, of such a cutter having a series of gear-like planing teeth arranged on a circular pitch line and being interrupted at one side of the cutter through a width sufficient to admit an uncut blank into pitch line relationship with the cutter; the number of teeth of the cutter being at least as great as the number of teeth to be formed in the work piece.

28. A multiple spindle gear shaping machine comprising a gear shaping cutter having a circular series of teeth, the number of which is at least as great as the number of teeth to be cut in the work, and having also at one side an open space in which there are no teeth, a plurality of spindles arranged about the axis of said cutter equidistant therefrom and in positions to hold a plurality of work pieces in simultaneous cutting relationship with the cutter, means for reciprocating the cutter, and means for revolving the work spindles about said axis with simultaneous rotation about their individual axes, said gap being sufficiently wide to receive an uncut gear blank clear of engagement with any of said teeth upon each work spindle when in position opposite to the gap.

29. A multiple spindle gear shaping machine comprising a shaping cutter having teeth arranged on a pitch line surrounding the axis of the cutter similarly to the teeth of a gear, said teeth being interrupted at one side of the cutter, a plurality of spindles arranged about the axis of said cutter equidistantly therefrom and in positions to hold a plurality of work pieces in simultaneous pitch line relationship with the cutter, means for reciprocating the cutter, means for revolving said work spindles about said axis while maintaining them at the same distance from the axis during all cutting strokes, and means for independently rotating said spindles about their own axes at such speeds as to roll the work pieces carried thereby in mesh with the cutter teeth; the number of cutter teeth being at least as great as the number of teeth to be cut in the work and having a pitch line length equal to the pitch line circumference of the work pieces, and the said interruption of teeth in the cutter being wide enough to permit placement of an uncut gear blank upon any spindle without making contact with the cutter teeth when such spindle comes opposite to the interruption.

30. A plural gear generating machine comprising a cutter having teeth arranged on a pitch line circumference similarly to the teeth of a gear wheel and having a gap at one side wherein there are no teeth, the cutter being more than twice as great in diameter as the gears to be cut and having at least twice as many teeth as the number of teeth to be cut in the work pieces, while the said gap is sufficiently wide to admit an untoothed gear blank into pitch line relationship with the cutter without making contact with any teeth, means for effecting simultaneous planetary and rolling movement of a plurality of gear blanks in pitch circle relation to the cutter as to a sun gear, and means for reciprocating the cutter axially.

31. A gear shaping machine including a planing cutter having cutting teeth disposed correspondingly to the teeth of a gear wheel, means for holding a plurality of work pieces spaced about the axis of said cutter equidistantly therefrom in position to be simultaneously operated on by said cutter, means for effecting relative reciprocation between said cutter and all of said work pieces simultaneously in the direction of the axis of the cutter, and means for giving said work pieces a planetary traverse about the axis of the cutter; the cutter being provided with such teeth throughout a part only of its circumference and having a space at one side devoid of teeth and wide enough to admit a gear blank into pitch circle relationship with the cutter without contact or mesh with any of the said teeth.

32. A machine for generating gears by a shaping operation without radial depth feed which comprises a gear shaper cutter having teeth arranged in the manner of gear wheel teeth around less than a complete pitch line circumference, a work spindle, means for effecting relative generative rolling movement between such cutter and work spindle without change of center distance around the pitch line circumference of the cutter from the point where the non-toothed portion of the cutter and the work spindle are in alinement radially of the cutter axis, means for effecting relative axial reciprocative cutting movements between the cutter and the work spindle, and means for causing a limited relative oscillative movement about said axis between the cutter and the work spindles intermediate successive cutting strokes.

EDWARD W. MILLER.